US012756104B1

(12) United States Patent
Nelson et al.

(10) Patent No.: US 12,756,104 B1
(45) Date of Patent: Oct. 6, 2026

(54) LOW-PROFILE MAGNETO-ELECTRIC DIPOLE ANTENNA

(71) Applicant: Lockheed Martin Corporation, Bethesda, MD (US)

(72) Inventors: Paul Jeffrey Nelson, Highlands Ranch, CO (US); Elie Germain Tianang, Aurora, CO (US); James F. Mulvey, Castle Pines, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 227 days.

(21) Appl. No.: 18/392,687

(22) Filed: Dec. 21, 2023

(51) Int. Cl.
*H01Q 9/28* (2006.01)
*H01Q 21/00* (2006.01)
*H01Q 21/06* (2006.01)
*H01Q 21/26* (2006.01)

(52) U.S. Cl.
CPC ........... *H01Q 9/285* (2013.01); *H01Q 21/062* (2013.01); *H01Q 21/26* (2013.01); *H01Q 21/0025* (2013.01)

(58) Field of Classification Search
CPC .. H01Q 9/285; H01Q 21/0025; H01Q 21/062; H01Q 21/26
See application file for complete search history.

(56) References Cited

U.S. PATENT DOCUMENTS

| | | | | |
|---|---|---|---|---|
| 8,462,071 | B1 | 6/2013 | Rudish et al. | |
| 9,455,500 | B1 | 9/2016 | West et al. | |
| 9,735,475 | B2 | 8/2017 | Anderson et al. | |
| 10,320,085 | B1 | 6/2019 | Lier et al. | |
| 10,651,566 | B2 | 5/2020 | Adams et al. | |
| 11,152,715 | B2 | 10/2021 | Isom et al. | |
| 11,196,184 | B2 | 12/2021 | Jordan et al. | |
| 12,418,112 | B2 | 9/2025 | Park et al. | |
| 2006/0097921 | A1* | 5/2006 | Luk .......................... | H01Q 9/36 343/700 MS |
| 2007/0210976 | A1 | 9/2007 | Luk et al. | |
| 2017/0187105 | A1* | 6/2017 | Emerick ................ | H01Q 21/22 |
| 2018/0337462 | A1 | 11/2018 | Vollmer et al. | |
| 2020/0361635 | A1 | 11/2020 | Braun et al. | |
| 2021/0013610 | A1* | 1/2021 | Chiang .................. | H01Q 21/24 |

OTHER PUBLICATIONS

Li, Mingjian et al., "Wideband Magnetoelectric Dipole Antennas With Dual Polarization and Circular Polarization," IEEE Antennas and Propagation Magazine, vol. 57, No. 1, pp. 110-119, Feb. 2015.

* cited by examiner

*Primary Examiner* — Amal Patel

(57) ABSTRACT

Provided herein are various enhancements for magnetoelectric diploe antenna assemblies, arrays, and associated antenna structures. In one example, an antenna structure includes patch elements conductively coupled to a baseplate by support members that position the patch elements at a vertical offset from a surface of the baseplate. The support members comprise meandered features on surfaces abutting gaps between the support members housing orthogonal antenna feeds coupled to radio frequency links for the antenna structure.

19 Claims, 8 Drawing Sheets

LOW-PROFILE MAGNETO-ELECTRIC DIPOLE ANTENNA

TECHNICAL BACKGROUND

Various radio frequency antenna arrangements have been developed for microwave frequency applications, such as use on space-deployed craft for communications and ranging. Some example antenna arrangements include dipole, slot, helix, horn, Yagi, microstrip, and patch antennas, each with various limitations on packaging, bandwidth, cross-polarization, and radiation pattern directivity. Many emerging applications for microwave radio frequency (RF) transmissions include arrays of dozens or hundreds of antenna elements, useful for applications such as electronically-steerable arrays (ESAs), which establish packaging or sizing requirements that exclude certain antenna styles or types. Also, when deployed into vacuum environments, such as orbit or space, multipaction effects can limit power handling capabilities of many antenna types.

Magnetoelectric (ME) dipole antennas have been developed which include antenna arrangements having two T-shaped or U-shaped orthogonal probes surrounded by four conductive patches that are positioned above a ground plane. The conductive patches in the ME dipole antenna act as radiating surfaces, while energized probes transmit/receive RF signals by way of associated RF connectors. Portions of the probes located between gaps in the conductive patches couple the RF energy carried by the antenna. However, existing ME dipole antennas suffer from several limitations, including large height dimensions (e.g., 0.252) that are physically significant for certain frequency ranges, which can limit deployment for some space-deployed applications, and precludes use in deployable tile-based ESAs.

Some height-reduction techniques have been developed for ME dipole antennas, such as meandered vertical vias which are limited to printed circuit board (PCB) based ME dipole antennas, bent sheet metal forming the radiating patch shorting walls which are not compatible with dual-polarized or cross-polarized antennas, or the addition of an artificial magnetic conductor (AMC) which adds complexity and thickness/mass, reduces bandwidth, and is limited to PCB based ME dipole antennas.

SUMMARY

Magnetoelectric (ME) dipole antennas have become popular radio frequency (RF) radiating elements for ESAs and 5G applications, among others, due to several favorable performance characteristics. However, the traditional height of ¼ wavelength (0.25λ) for ME dipole antennas still limit certain deployments and applications for these antennas. Provided herein are various enhanced ME dipole antenna structures and arrays having a height reduction of over 50% compared to traditional ME dipole designs. This 50% height reduction corresponds to ~0.12λ height. Moreover, a modular construction provides for "plug-in" of radiator elements which leads to significant cost and assembly benefits. The height reduction is achieved, at least in part, by meandered vertical supports for radiating patch elements of the ME antenna structures. As will be discussed herein, these meandered vertical supports can take various forms or shapes, depending on the application, desired performance characteristics, mechanical considerations, and other factors.

In one example implementation, an antenna structure includes patch elements conductively coupled to a baseplate by support members that position the patch elements at a vertical offset from a surface of the baseplate. The support members comprise meandered features on surfaces abutting gaps between the support members housing orthogonal antenna feeds coupled to radio frequency links for the antenna structure.

In another example implementation, an antenna array includes an array baseplate having apertures into which a plurality of antenna subassemblies are held. Each of the plurality of antenna subassemblies comprise a set of four patch elements conductively coupled to a subassembly baseplate by corresponding support members that position the patch elements at a vertical offset from a surface of the baseplate. The support members comprise meandered features on surfaces abutting gaps between the support members housing orthogonal antenna feeds coupled to radio frequency links for the antenna structure.

In yet another example implementation, a method includes forming a modular antenna structure by at least positioning overlapping orthogonal antenna feeds in a central region of a baseplate of the modular antenna structure, and attaching radiator subassemblies to the baseplate disposed about the orthogonal antenna feeds. The radiator subassemblies comprise patch elements conductively coupled to the baseplate by support members that position the patch elements at a vertical offset from a surface of the baseplate. The support members comprise meandered features on surfaces abutting the central region between the support members. The method also includes forming an antenna array by at least mounting baseplates of a plurality of the modular antenna structures into mounting features in an array baseplate, where the array baseplate establishes a grid of the plurality of the modular antenna structures.

This summary is provided to introduce a selection of concepts in a simplified form that are further described below in the detailed description. It may be understood that this summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Magnetoelectric (ME) dipole antennas have become popular radio frequency (RF) radiating elements for ESAs, 5G applications, 5G.MIL applications, and radionavigation-satellite service (RNSS) implementations, among others, due to several favorable performance characteristics. The various ME dipole antennas discussed herein include arrangements having T-shaped or U-shaped antenna 'probes' or feed elements surrounded by conductive patches positioned above a baseplate by vertical support members. Transmit/receive RF signals are fed through the baseplate via associated RF connections to feed elements. Example performance characteristics which are favorable in ME dipole antennas include a generally planar configuration, wide impedance bandwidth, stable radiation patterns over selected frequency bands, excellent port-to-port isolation, low axial ratio (for circularly polarized applications), low scan loss, low ohmic loss, and low mass compared to patch arrays at low frequencies. When deployed in space applications, such as on satellites, these ME dipole antennas can be a fraction of the protrusion profile of helix antennas, and half the weight of microstrip patch arrays.

However, even with the aforementioned characteristics of conventional ME dipole antennas, the electrical height for efficient operation of ME dipole antennas forces a particular mechanical height in conventional ME dipole antenna designs. Specifically, the traditional electrical height is ¼ wavelength (¼λ or 0.25λ) at center frequency for ME dipole antennas, which precludes certain deployments and applications for these antennas, such as deployable tile-based ESAs. This height becomes significant at lower band microwave frequencies, such as L band frequencies, among others.

Provided herein are various enhanced ME dipole antenna structures and arrays having a height reduction of over half (50%) compared to traditional ME dipole designs. This height reduction provides approximately a 0.12λ height, or less. Moreover, a modular construction can be employed for a "plug-in" configuration of radiator elements which leads to significant cost and assembly benefits. The noted height reduction is achieved, at least in part, by meandered vertical supports for radiating patch elements of the ME antenna structures. As will be discussed herein, these meandered vertical supports can take various forms or shapes, depending on the application, desired performance characteristics, mechanical considerations, and other factors.

Figure 1:
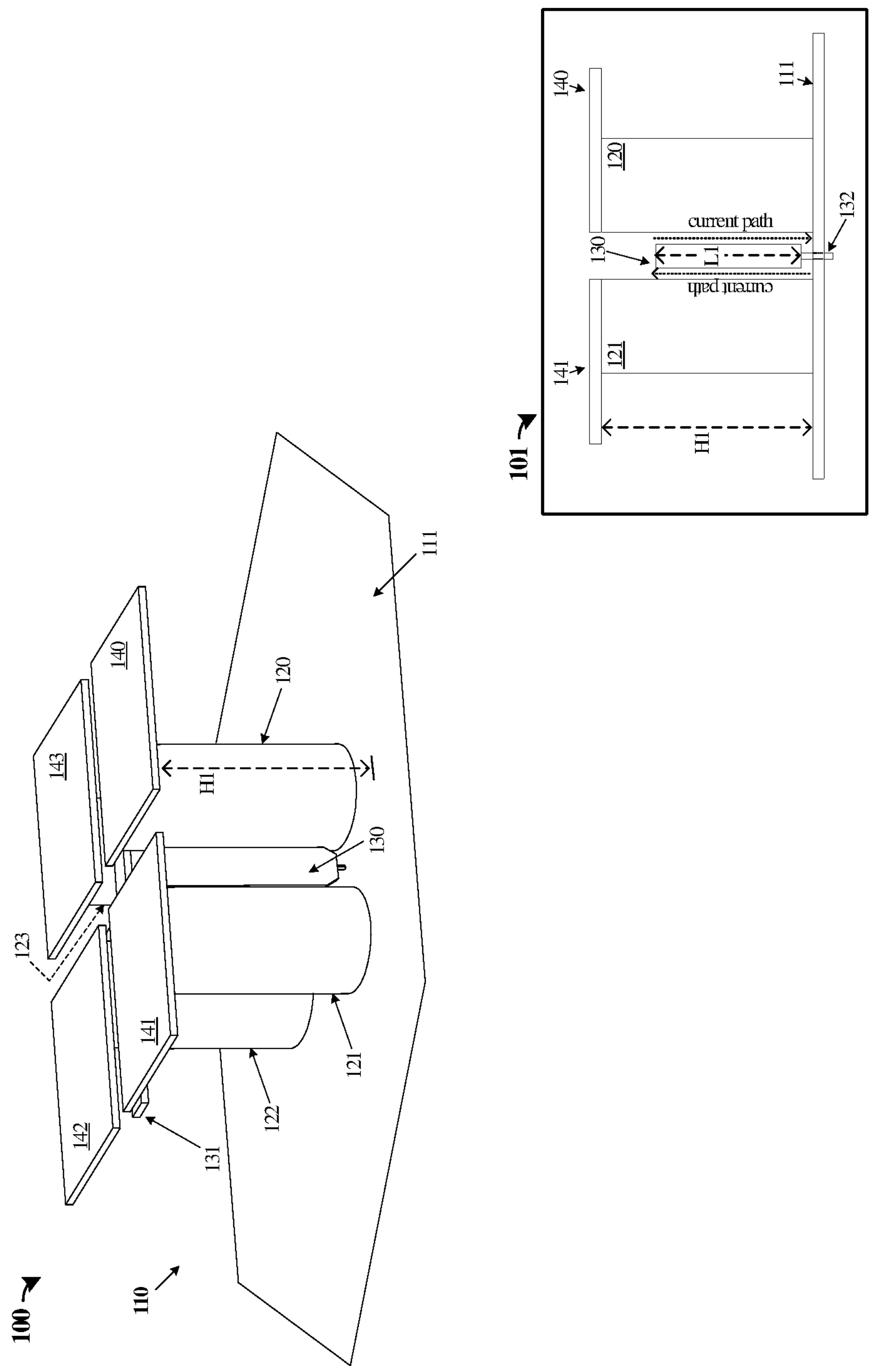
FIG. 1 illustrates an antenna structure in an implementation.

FIG. 1 is included to show a conventional ME dipole antenna design having a ¼ wavelength (¼λ) or greater height. FIG. 1 includes antenna configuration 100 including antenna structure 110 which comprises baseplate 111 coupled to four vertical support posts, columns, or members 120-123 (column 123 partially hidden from view). These support members 120-123 conductively couple corresponding patch or patch elements 140-143 to baseplate 111 and provide a vertical offset (h1) for patch elements 140-143 from baseplate 111 of 0.252 or greater. Although FIG. 1 is not shown to scale, for certain frequency ranges, H1 can correspond to a height from baseplate 111 to the top of patches 140-143 of approximately 1.6 inches. Positioned between gaps of support members 120-123 are orthogonally oriented Γ-shaped feed elements 130-131, which overlap and couple to external RF links that feed antenna structure 110. Each of feed elements 130-131 comprise a conductive strip having a feed section coupled to an RF connection through baseplate 111, a transverse section generally parallel with baseplate 111, and a terminal section directed back toward baseplate 111.

In transmit (Tx) operations, RF energy is fed to feed elements 130-131 and an RF ground is coupled to baseplate 111. This configuration excites a magnetic dipole mode and electric dipole mode in antenna structure 110. Specifically, feed elements 130-131 excite the electric dipole mode via patch elements 140-143 at nominally a 180° phase difference (90° per side), and excite the magnetic dipole mode via capacitive coupling to the vertical sides of support members 120-123. Receive (Rx) operations couple through antenna structure and feed elements in a reverse configuration than transmit operations. In this example, patch elements 140-143 need a vertical offset of ¼λ (at a center frequency of antenna structure 110) from baseplate 111, which is electrically grounded, to function properly and achieve a nominal 180° phase difference between horizontal radiating patches (patch elements 140-143).

View 101 illustrates a side view of antenna structure 110 to illustrate a height or vertical offset (h1), as well as a length (L1) of a first feed section of feed element 130 which couples to an RF link over connection 132 through an electrically isolated hole in baseplate 111. As can be seen in view 101, current paths are shown as induced on support members 120-121 along vertical surfaces adjacent to feed element 130. These current paths have a corresponding phase delay ($\varphi_{delay}$) associated therewith, due in part to the length of the current paths (H1). Since H1 corresponds to ¼λ at a center frequency of antenna structure 110, a nominal 180° phase difference between horizontal radiating patches is achieved.

Figure 2:
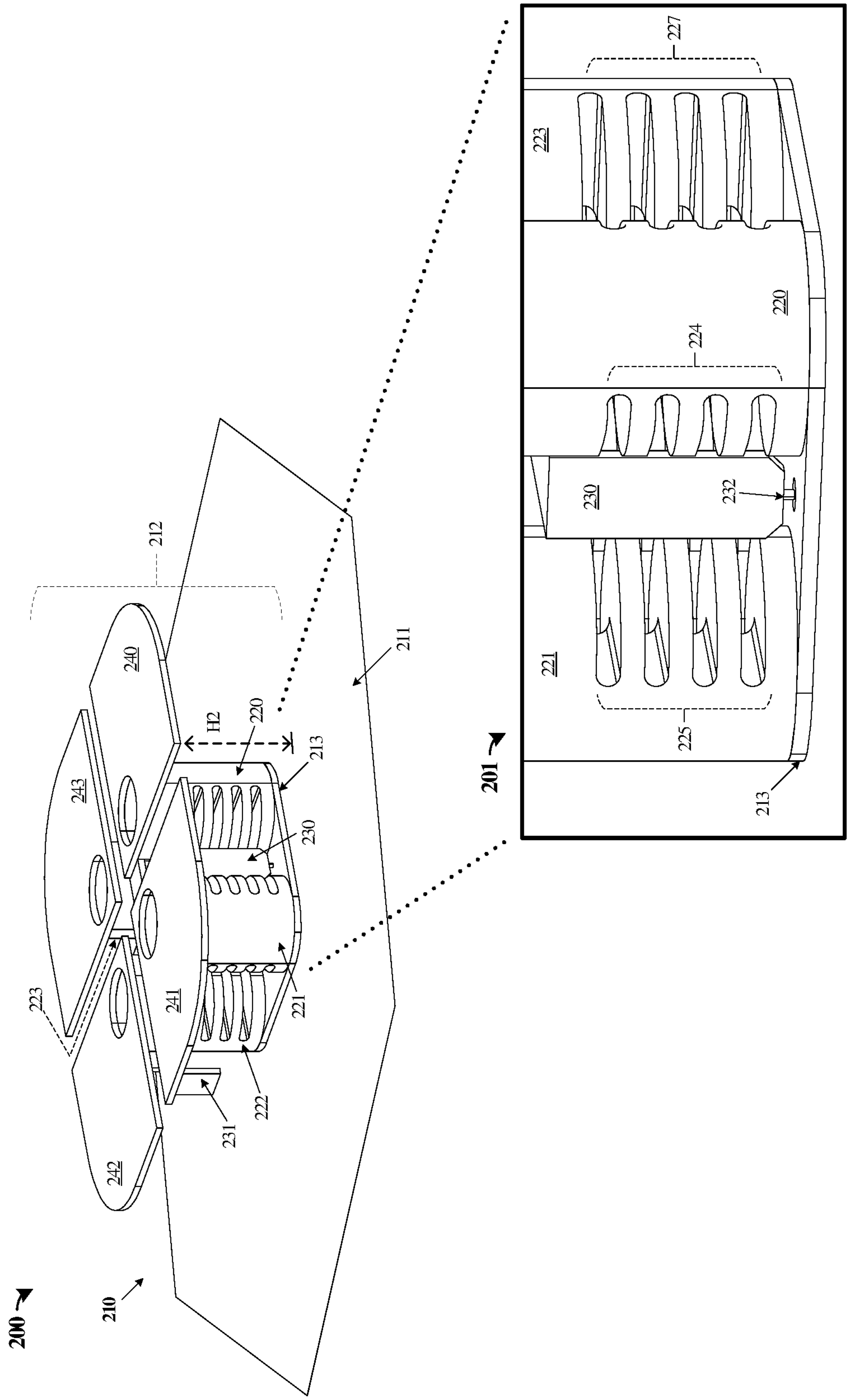
FIG. 2 illustrates an antenna structure in an implementation.

FIG. 2 is now presented to illustrate an enhanced ME dipole antenna design having substantially less than a ¼ wavelength (¼λ) or greater height. FIG. 2 includes antenna configuration 200 including antenna structure 210 which comprises baseplate 211, onto which antenna subassembly 212 is coupled by mounting base 213. Antenna subassembly 212 comprises mounting base 213 coupled to further elements of antenna structure 210. These further elements include four vertical support members 220-223 (column 223 partially hidden from view) conductively coupled to mounting base 213. Vertical support members 220-223 conductively couple to corresponding patch or patch elements 240-243 and provide a vertical offset (h2) for patch elements 240-243 from baseplate 211. Positioned between gaps of support members 220-223, and mounted to mounting base 213, are orthogonally oriented T-shaped feed elements 230-231, which overlap and couple to external RF links that feed antenna structure 210. Each of feed elements 230-231 comprise a conductive strip having a feed section coupled to an RF connection through mounting base 213 (and potentially through baseplate 211), a transverse section generally parallel with mounting base 213, and a terminal section directed back toward mounting base 213.

However, in this example, patch elements 240-243 do not need vertical offset (h2) of ¼λ (at a center frequency of antenna structure 210) from baseplate 211, which is electrically grounded, to function properly and achieve a nominal 180° phase difference between horizontal radiating patches (patch elements 240-243). Thus, h1 of FIG. 1 is substantially greater than h2 of FIG. 2, with h2 being on the order of approximately a 0.122 or less.

To achieve this reduction in vertical offset and height while maintaining favorable performance characteristics, antenna structure 210 includes meandered features on support members 220-223. View 201 shows a detailed view of support members 220-223, with meandered portions 224, 225, and 227 visible for corresponding support members 220, 221, and 223. The meandered features comprise corrugations, helical features, or slots formed into bodies of support members 220-223 such that an RF phase/time delay over a conductive path formed between baseplate 211 (or 213) and the patch elements 240-243 is larger than a phase/time delay corresponding to the vertical offset (H2). This increase in delay over a shorter vertical offset is provided by the corrugations which establish an increased length of a current path of RF energy coupled onto the surfaces of support members 220-223 adjacent to feed elements 130-131.

The term phase delay corresponds to a time delay or electrical propagation delay for an RF signal at a particular frequency or set of frequencies. For wideband operations, the phase delay might differ slightly over an entire frequency range as compared to an electrical length or time/propagation delay. When corrugations or meandered features are not included, such as in FIG. 1, the phase delay (for a given frequency), time delay, or electrical length will be generally the same as an offset height. However, when the corrugations or meandered features are included, such as in FIG. 2, then an increase in time delay, electrical propagation delay, or phase delay (for a given frequency) is achieved over a particular offset height. This can advantageously provide shorter offset heights to achieve a selected time delay, electrical propagation delay, or phase delay (for a given frequency).

In transmit (Tx) operations, RF energy is fed to feed elements 230-231 which excite a magnetic dipole mode and electric dipole mode in antenna structure 210. Specifically, feed elements 230-231 excite the electric dipole mode via patch elements 240-243 at nominally 180° a phase difference (90° per side), and excite the magnetic dipole mode via capacitive coupling to the vertical sides of support members 220-223. Advantageously, the target phase relationship for patch elements 240-243 is achieved over a shorted vertical offset from baseplate 211. Receive (Rx) operations couple through antenna structure and feed elements in a reverse configuration than transmit operations.

Figure 3:
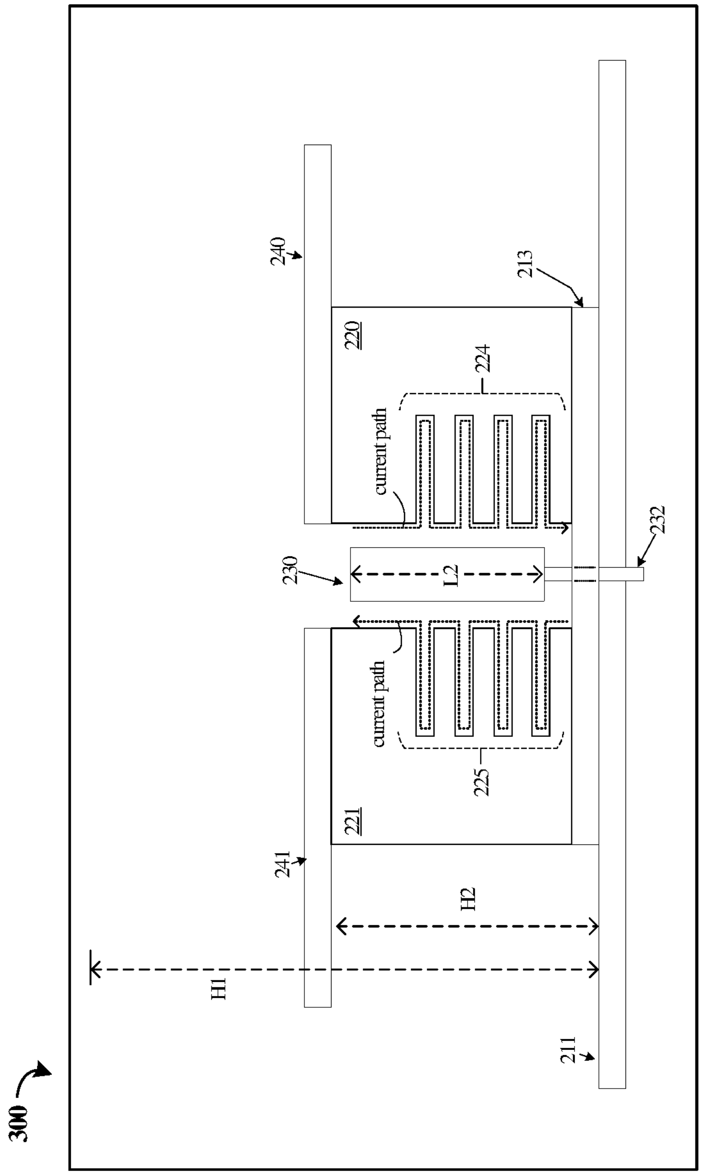
FIG. 3 illustrates an antenna structure in an implementation.

FIG. 3 includes view 300 illustrating a side view of antenna structure 210 to illustrate a height or vertical offset (H2), as well as a length (L2) of a first feed section of feed element 230 which couples to an RF link over connection 232 through an electrically isolated hole in mounting base 213 and/or baseplate 211. As can be seen in view 300, current paths are shown as induced on support members 220-221 along surfaces adjacent to feed element 230. Support members 220-221 have meandered features embedded therein, and provide additional pathlength adjacent to feed element 230. Thus, the surface currents on support members 220-221 follows a serpentine pathway along surfaces of the meandered features.

These current paths have a corresponding time/electrical delay associated therewith, due in part to the length of the electrical/current paths which are greater than the vertical offset of H2. This configuration establishes a ¼λ electrical delay without requiring a ¼λ height or vertical offset, as shown for comparison length H1. Since the electrical delay corresponds to ¼λ at a center frequency of antenna structure 210, a nominal 180° phase difference between horizontal radiating patches is achieved.

Also, in view 300, H2 is shown as a vertical offset of patch elements 240-243 to baseplate 211. Depending on the arrangement of mounting base 213, additional height might be added from mounting base 213, which can be taken up by thicknesses of patch elements 240-243 or length adjustments in support members 220-223. Alternatively, mounting base 213 might be fitted into a hole or aperture in baseplate 211 such that a flush mounting of mounting base 213 into baseplate 211 is established. Furthermore, it should be noted that feed element 230 has a shorter vertical extent between the support members than that of antenna arrangement 110 in FIG. 1. This arrangement provides for a shorter vertical offset of patch elements 240-243, which can prevent feed members from having vertical feed portion lengths (L1) seen for antenna arrangement 110 in FIG. 1. Feed portion lengths of feed elements 230-231 can be reduced, and lengths of transverse portions or terminal portions of feed elements might be increased to maintain a desired total length for the feed elements within the shorter height of antenna arrangement 210.

Figure 4:
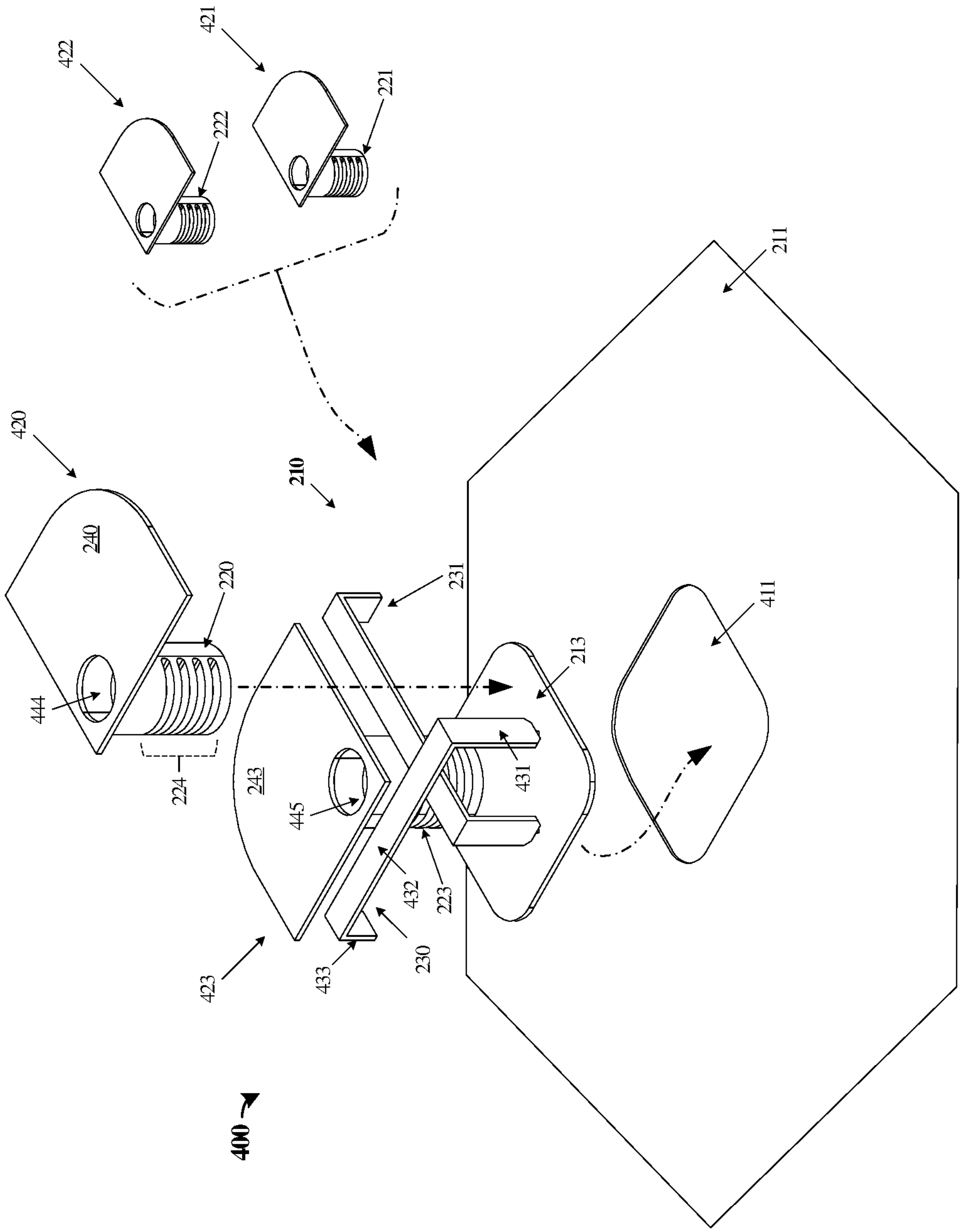
FIG. 4 illustrates assembly of portions of an antenna structure in an implementation.
Figure 6:
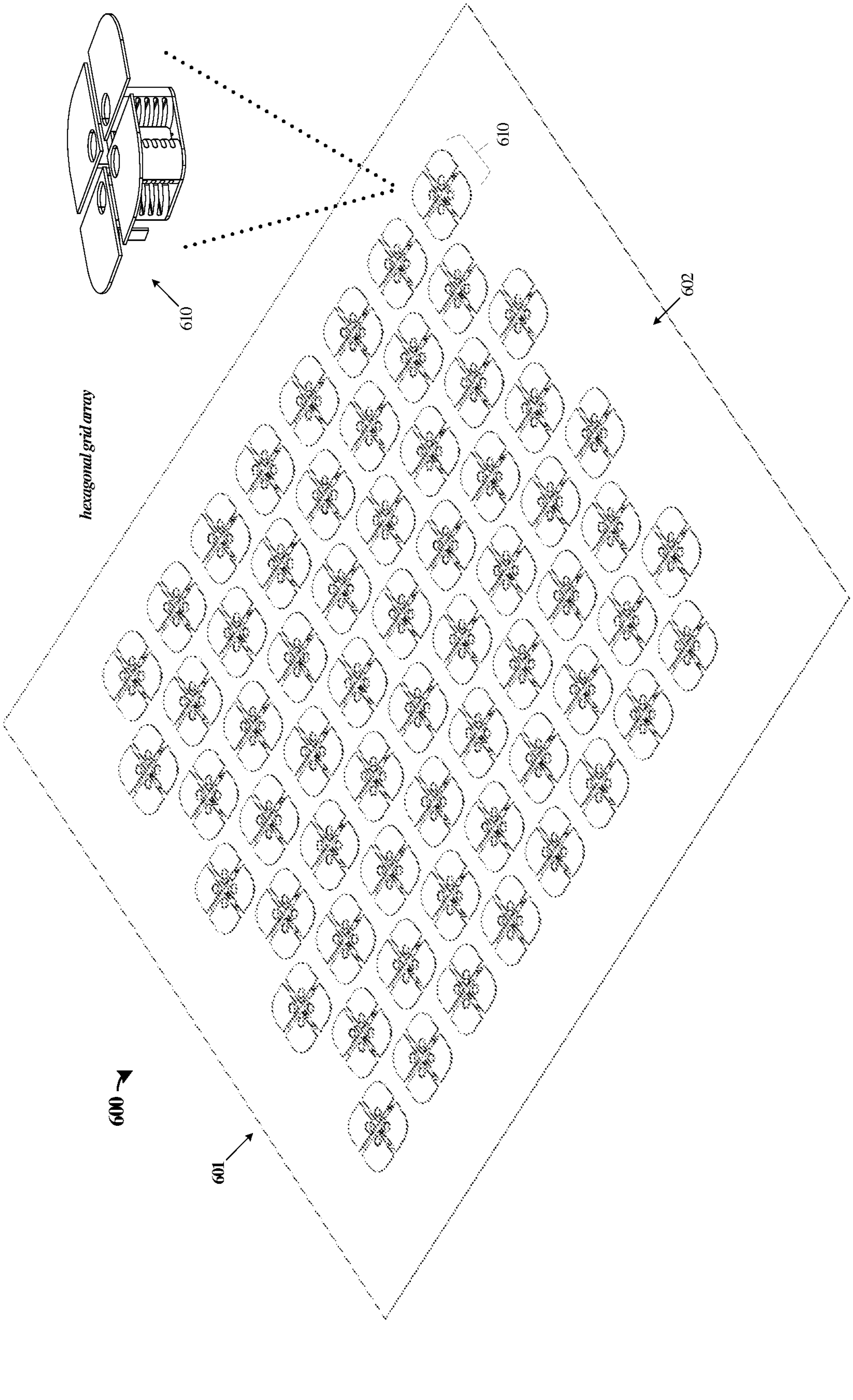
FIG. 6 illustrates a hexagonal grid antenna array in an implementation.
Figure 7:
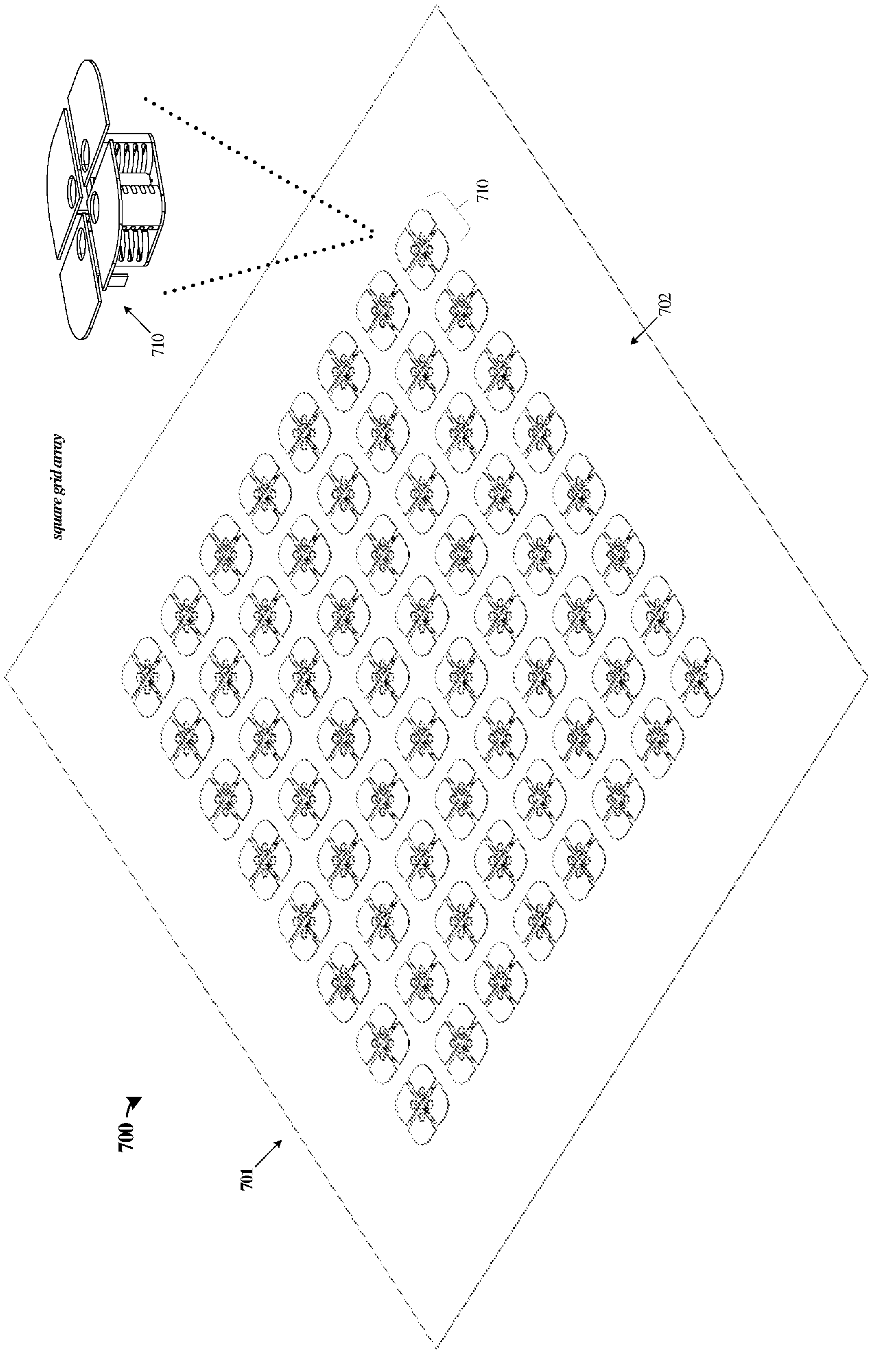
FIG. 7 illustrates a square grid antenna array in an implementation.

FIG. 4 illustrates assembly of portions of antenna structure 210 in an implementation. View 400 includes assembly or manufacturing steps which can be employed to assemble or otherwise manufacture antenna structure 210. Other configurations and steps might instead be employed, and thus view 400 is one example manufacturing implementation. View 400 shows baseplate 211 having mounting aperture 411 into which an assembled antenna structure 210 can be plugged, inserted, or otherwise mounted. Antenna structure 210 has various components assembled into a subassembly having mounting base 213 as a local ground and substructure. Individual dipole subassemblies comprising vertical support members and patch elements can be attached to mounting base 213, along with feed elements. Then, this completed subassembly can be mounted to baseplate 211 to complete assembly of antenna structure 210. In this example, baseplate 211 includes mounting aperture 411 for a single antenna structure, but other examples can have a plurality of mounting apertures, such as for an antenna array. Example antenna arrays are shown in FIGS. 6 and 7.

Specifically, dipole subassemblies 421-423 are shown comprising an associated support member 220-223 and patch element 240-243. Each dipole subassembly can be affixed to mounting base 213, such as by fasteners, welds, adhesives, self-mounting features, alignment pins, friction fit, quick disconnect couplers, bonding agents, conductive couplers, or other elements. As seen in view 400, meandered features (e.g., 224) of each support member is positioned to face an internal feed elements 230-231. Patch elements can be affixed to associated support members prior to dipole subassemblies 421-423 being attached to mounting base 213, but other examples can have these patch elements attached at different times. Alternatively, dipole subassemblies 421-423 with support members and patch elements can each be formed as a monolithic structure, such as by molding, casting, additive manufacturing (3D printing), electrical discharge machining (EDM), and the like.

Feed elements 230-231 are shown having a generally T-shaped arrangement. Each of feed elements 230-231 comprise a conductive strip having a feed section (431) coupled to an RF connection through mounting base 213, a transverse section (432) generally parallel with mounting base 213, and a terminal section (433) directed back toward mounting base 213. The total length of feed elements 230-231 typically is selected based on a frequency range or center frequency supported by antenna structure 210. Feed elements 230-231 can be affixed to mounting base 213, with a feed extension member of feed sections positioned through a dielectrically lined port in mounting base 213 to couple to RF feed links. The feed extension members conductively couple each of the feed elements through mounting base 213 to a center conductor of a corresponding RF connector. The RF connectors typically comprise coaxial connectors and can be any suitable connector type or size based on the application. Example RF connector types include threaded, press-fit, bayonet, friction-fit, or other connector types able to be disconnected and re-connected. Example standardized coaxial connector styles include Threaded Neill-Concelman (TNC), Bayonet Neill-Concelman (BNC), and SMA (Sub-Miniature version A) connectors, among others.

Support voids are also included in each patch element and support member, such as shown for support voids 444 and 445 for dipole subassemblies 420 and 423. These voids can be included to reduce a mass or weight of each dipole subassembly, and may penetrate partially down a longitudinal axis of each dipole subassembly, stopping at the meandered features in some examples.

In addition, various dielectric fill material can be included to support and fill spaces around feed elements and support members, including within the meandered features. This dielectric fill material (not shown in FIG. 4 for clarity) can reduce multipaction effects when antenna structure 210 is deployed into vacuum environments. The dielectric fill material can comprise a material having structural or rigidity properties sufficient to meet the desired structural, vibrational, and shock environmental requirements. The dielectric fill material can be formed from various materials that act as a dielectric at least for the frequencies of concern for the corresponding feed elements. Example dielectric foam materials can be employed include polymethacrylimide foam, melamine foam, polyurethane foam, ceramic foam, dielectric-coated metallic foams, carbon-impregnated or carbon-fiber foams, or other structural foams, including open or closed cell, reticulated or non-reticulated foam configurations. While non-conductive and non-attenuative foam (i.e. RF transparent to the associated transmission/reception frequencies) can be employed, some examples may employ RF-attenuative foam materials, such as carbon-impregnated, metal-impregnated, carbon fiber, dielectric coated metallic foams, or other suitable materials. However, regardless of the foam material, channels can be formed into the foam material which can accept feed elements or conform to the meandered features of support members. The feed elements and support members can be surface-recessed to be flush or at least partially embedded within the foam material. This configuration can reduce susceptibility of the feed elements and support members to vibration failure, increase structural rigidity of the antenna structure, and reduce multipaction effects when deployed in vacuum or space environments. Outgassing of dielectric materials can be taken into account to reduce or eliminate outgassing of the material components that form the foam when deployed into a vacuum or partial vacuum. In addition, durability to incident radiation, such as solar irradiance, can be considered in the material selection to reduce or prevent ultraviolet (UV) degradation of the material, among other considerations.

Various materials and manufacturing techniques can be employed for baseplate 211, mounting base 213, patch elements 240-243, and support members 221-223, among other elements in antenna structure 210. Individual elements or subassemblies of elements in antenna structure 210 might be formed into or from a single monolithic workpiece, such as by machining, electrical discharge machining (EDM), additive manufacturing, casting, molding, or other techniques. Example materials include conductive materials or conductively-coated materials, such as aluminum, copper, or coated/plated polymers, including alloys and combinations of materials. Feed elements 230-231 can be formed using similar techniques and materials as for elements in antenna structure 210, and are typically manufactured as separate workpieces. However, some examples may have feed elements 230-231 formed from stamped metal strips or folded metal strips.

Figure 5:
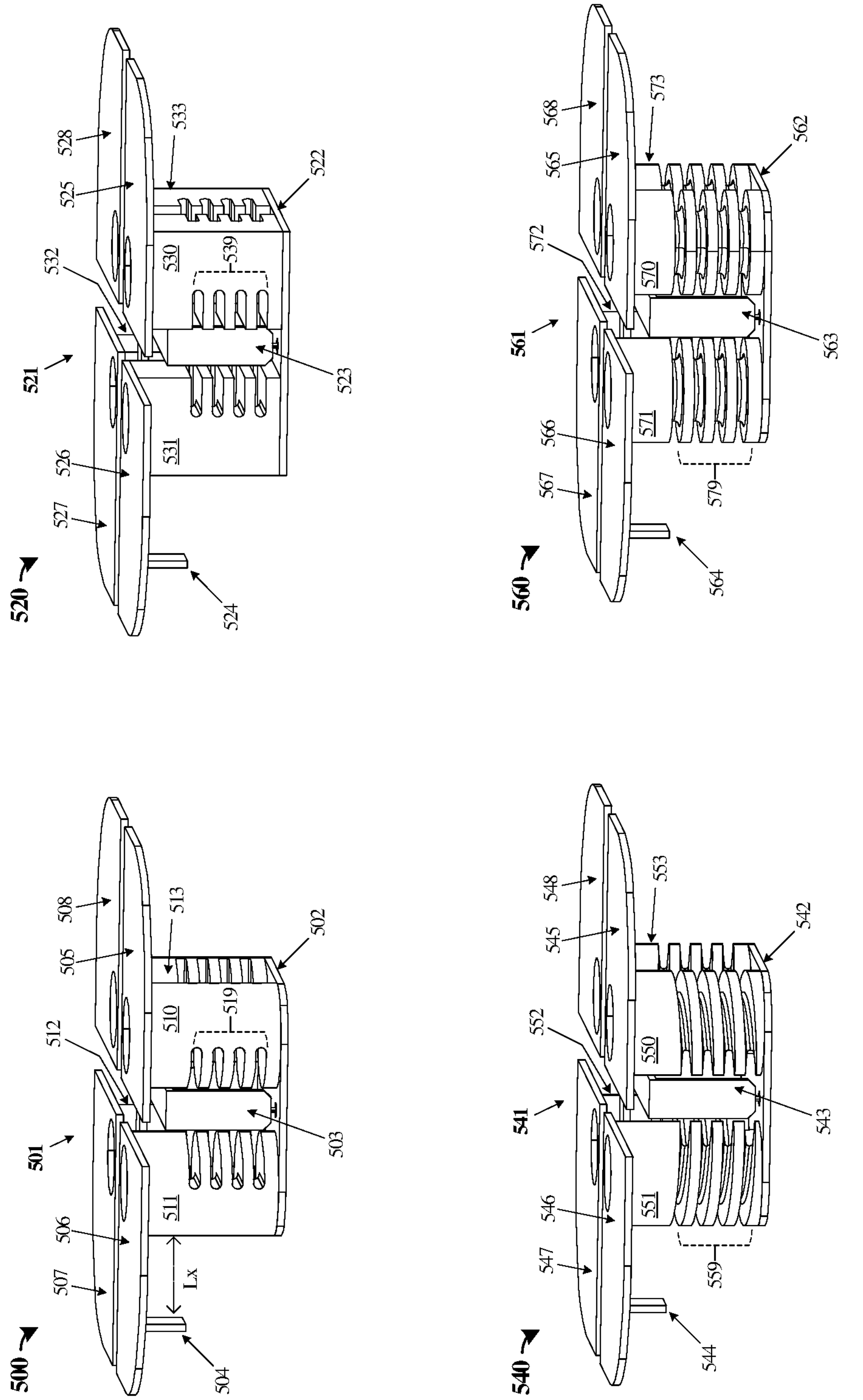
FIG. 5 illustrates alternative examples of antenna structures.

FIG. 5 illustrates alternative examples of antenna structures. Similar structures, materials, and configurations are shown in FIG. 5 as are also shown in the preceding Figures. However, support members for patch elements in FIG. 5 are shown as having a variety of alternative implementations, and the examples in FIG. 5 are not exhaustive of the various types of meanders or corrugations, including permutations and combinations thereof. For example, one could include various cross-sectional types of vertical posts and various styles of corrugations, or corrugations might have selected slope angles to enhance certain manufacturing techniques (e.g., 3D printing) to achieve desired overhang angles. Thus, similar manufacturing techniques and materials, along with similar assembly procedures can be employed for the examples in FIG. 5.

Turning first to example 500, a similar configuration as shown for antenna structure 210 is shown for antenna structure 501. Antenna structure 501 includes mounting base 502 which has various components mounted thereto. These components include feed elements 503-504 and support members 510-513 which support patch elements 505-508 at a selected vertical offset from mounting base 502. Support members 510-513 include meandered features 519, as discussed herein, which increase an effective electrical length or time delay for RF energy/signals that are coupled by support members. This increase in electrical length or time delay is larger than the physical vertical offset, and thus provides for a more compact arrangement. In this example, meandered features 519 are formed into internal surfaces of cylindrically shaped support members (also referred to as shorting posts). These internal surfaces face an interior space or gaps established by support members 510-513 into which feed elements 503-504 are positioned. Thus, meandered features 519 are electrically adjacent to feed elements 503-504.

Turning to next to example 520, antenna structure 521 includes mounting base 522 which has various components mounted thereto. These components include feed elements 523-524 and support members 530-533 which support patch elements 525-528 at a selected vertical offset from mounting base 522. Support members 530-533 include meandered features 539, as discussed herein, which increase an effective electrical length or time delay for RF energy/signals that are coupled by support members. This increase in electrical length or time delay is larger than the physical vertical offset, and thus provides for a more compact arrangement. In this example, meandered features 539 are formed into internal surfaces of rectangular prism-shaped support members. These internal surfaces face an interior space or gaps established by support members 520-523 into which feed elements 523-524 are positioned. Thus, meandered features 539 are electrically adjacent to feed elements 523-524.

Turning to now to example 540, antenna structure 541 includes mounting base 542 which has various components mounted thereto. These components include feed elements 543-544 and support members 550-553 which support patch elements 544-547 at a selected vertical offset from mounting base 542. Support members 550-553 include meandered features 559, as discussed herein, which increase an effective electrical length or time delay for RF energy/signals that are coupled by support members. This increase in electrical length or time delay is larger than the physical vertical offset, and thus provides for a more compact arrangement. In this example, meandered features 559 are formed as helical meanders in cylindrically shaped support members. Helical (or spiraled) meandered features can be less difficult to additively manufacture or 3D print, in some instances, and can also be more dynamically stable compared to other meandered features. Also, the pitch of the helical shape can provide for more desirable angles for 3D printing techniques to avoid overhang, or to establish draft angles for injection molding techniques. While circumscribing or penetrating about an entire circumference of support members 550-553, the helical meandered features also have a portion facing an interior space or gaps established by support members 550-553 into which feed elements 543-544 are positioned. Thus, a portion of meandered features 559 are electrically adjacent to feed elements 543-544.

Turning to finally to example 560, antenna structure 561 includes mounting base 562 which has various components mounted thereto. These components include feed elements 563-564 and support members 570-573 which support patch elements 564-567 at a selected vertical offset from mounting base 562. Support members 570-573 include meandered features 579, as discussed herein, which increase an effective electrical length or time delay for RF energy/signals that are coupled by support members. This increase in electrical length or time delay is larger than the physical vertical offset, and thus provides for a more compact arrangement. In this example, meandered features 579 are formed as stacked circumferential meanders in cylindrically shaped support members. Stacked circumferential meandered features can be less difficult to additively manufacture or 3D print, in some instances, and can also be more dynamically stable compared to other meandered features. Stacked circumferential meandered features can be formed by concentric cuts about a post element, or these features can be additively manufactured to have sloped angles to prevent or reduce overhangs. While circumscribing or penetrating about an entire circumference of support members 570-573, the stacked circumferential meandered features also have a portion facing an interior space or gaps established by support members 570-573 into which feed elements 563-564 are positioned. Thus, a portion of meandered features 579 are electrically adjacent to feed elements 563-564.

Although the examples in FIG. 5 include generally perpendicular and planar corrugations 'cut' into otherwise smooth vertical support member surfaces, various chamfers, tapers, or edge rounding can be employed. Moreover, other examples might include tapered or sloped corrugations (e.g., 45° or other suitable angle), cog-style corrugations, trapezoidal cross-sectional cuts, and the like. Regardless of the exact shape or configuration of the meandered features, these features advantageously establish an increased electrical length over a shorter vertical offset, leading to a desirable phase difference between horizontal radiating patches comprising the patch elements. Also, the quantity of corrugations or cuts can be selected to establish the desired electrical length of the selected vertical offset, from a minimum of one corrugation, to a maximum number of corrugations that is limited by the frequency range, material composition and minimum thickness, RF inductance increases proportional to a quantity of corrugations, and packaging constraints, such as packaging constraints to fit feed elements into the vertical offset envelope. For example, an RF length of the feed elements can be kept even when the vertical offset is reduced, which may include increasing a length of the transverse portion of the antenna feed. This increased length of the transverse portion is shown as length Lx for antenna feed 504 in FIG. 5.

FIG. 6 illustrates a hexagonal grid configuration of an antenna array in an implementation. Specifically, view 600 of FIG. 6 illustrates antenna array 601 having a plurality of antenna structure instances coupled to baseplate 602. Example antenna structure instance 610 is shown which can be plugged into or otherwise attached into baseplate 602. Thus, the configuration shown in FIG. 6 comprises a modular, pluggable, antenna array of individual antenna structures. These antenna structures can be assembled separately and individually into subassemblies which are then further assembled into a large array assembly reflected by antenna array 601. The exact quantity of antenna structures employed in antenna array 601 can vary based on application, such as beamforming requirements, power requirements, directivity, scan angle requirements, and other factors.

FIG. 7 illustrates a square or rectangular grid configuration of an antenna array in an implementation. Specifically, view 700 of FIG. 7 illustrates antenna array 701 having a plurality of antenna structure instances coupled to baseplate 702. Example antenna structure instance 710 is shown which can be plugged into or otherwise attached into baseplate 702. Thus, the configuration shown in FIG. 7 comprises a modular, pluggable, antenna array of individual antenna structures. These antenna structures can be assembled separately and individually into subassemblies which are then further assembled into a large array assembly reflected by antenna array 701. The exact quantity of antenna structures employed in antenna array 701 can vary based on application, such as beamforming requirements, power requirements, directivity, scan angle requirements, and other factors.

Antenna array 601 of FIG. 6 and antenna array 701 thus form of FIG. 7 form Magneto-Electric Dipole Arrays (MEDAs) which can be selectively mounted to a further structure, which may be a portion of a satellite, vehicle, fixed mount, vessel, craft, or other mobile or fixed structure. Various RF circuitry and equipment can be coupled over RF links to the antenna arrays, such as amplifiers, beamforming circuitry, phase shifters, filters, polarizers, and various RF transmitter, receiver, or transceiver equipment. Thus, RF signals can be transmitted or received by the antenna arrays. Due to the enhanced height of individual antenna structures coupled to the baseplate, the available applications and mounting configurations are advantageously more numerous and performant than conventional antenna arrays.

Figure 8:
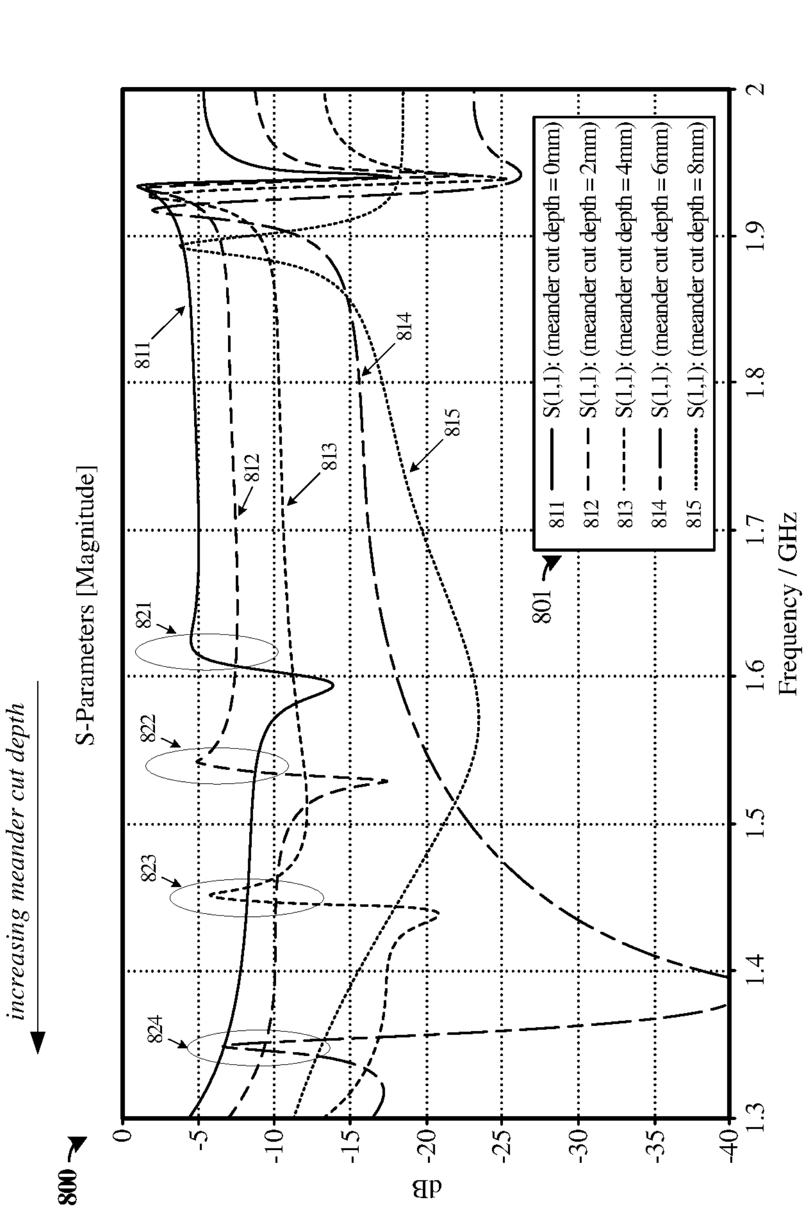
FIG. 8 illustrates example performance characteristics for a Magneto-Electric Dipole Array (MEDA) over various implementations.

FIG. 8 illustrates example performance characteristics for a Magneto-Electric Dipole Array (MEDA) over various implementations. The performance characteristics in FIG. 8 are shown in graph 800 which includes curves 811-815. Each curve represents a different meander 'cut' depth into a vertical support member of any of the antenna structures discussed herein. Specifically, selected depths of the corrugations which form the meandered features are related to performance in graph 800.

Legend 801 shows example meander cut depths of 0 millimeters (mm) for curve 811 (e.g., no corrugation/meandered features), 2 mm for curve 812, 4 mm for curve 813, 6 mm for curve 814, and 8 mm for curve 815. Curves 811-815 correspond to S-parameters (in dB) for increasing depths of the corrugations for a similar support member or shorting post configuration. S-parameters are measurements or simulations of performance of an RF system. For example, S11 corresponds to the input reflection coefficient. Typically, these parameters are simulated or measured over a frequency sweep, such as a portion of the L band from 1.3 GHz to 2 GHz in graph 800. Curves 811-814 each exhibit electric dipole resonances 821-824. As shown, electric dipole resonances shift down in frequency as the cut depth increases, resulting in an increase in the current path length.

Thus, the examples discussed herein provide for enhanced ME antenna structures having reduced heights while maintaining RF performance comparable to conventional ME designs. The ME examples herein can provide an active voltage standing wave ratio (VSWR) below 3:1 out to 60° scan angle for >20% bandwidth, and exhibits significantly improved RF performance over scan compared to most low-profile stacked patch antennas. Other advantages include consistent scan loss profile over a selected frequency band, with extremely low ohmic loss (e.g., ≤0.1 dB at L band), and a typical active VSWR over scan as less than 3.5 VSWR over 1.4-1.9 GHZ. Features also include wide impedance bandwidth, stable radiation patterns over selected frequency ranges, excellent port-to-port isolation, low axial ratio (e.g., for circularly polarized applications), low scan loss, low ohmic loss, and lower mass compared to patch arrays at low frequencies.

The aforementioned advantages and performance characteristics are achieved based in part on meandered features included in vertical support members between baseplate elements and patch dipole elements. The meandered features can comprise corrugations formed into bodies of the support members such that an RF time delay over a conductive path formed between the baseplate and the patch elements is larger than a time delay corresponding to the vertical offset distance. The vertical offset can comprise less than 0.252 at a center frequency of the antenna structure, such as approximately 0.122.

The frequency ranges for antenna structures, assemblies, subassemblies, arrays, components, configurations, systems, and arrangements herein include various RF bands, such as microwave frequencies. Different frequency bands can be supported by similar architectures as shown herein, with associated geometry scaling to suit the selected frequency ranges. Various examples might be configured to support frequency ranges, or portions thereof, corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHz), mid band (1.7 GHz to 2.5 GHz), high band (24 to 100 GHz (mmWave)) defined by the 3rd Generation Partnership Project (3GPP) and other organizations.

The functional diagrams, operational scenarios, manufacturing sequences, and mechanical diagrams provided in the Figures are representative of exemplary systems, environments, and methodologies for performing novel aspects of the disclosure. While, for purposes of simplicity of explanation, methods of use or manufacturing included herein may be in the form of a diagram, operational scenario or sequence, or other diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An antenna structure, comprising:

patch elements conductively coupled to a baseplate by support members comprising cylindrical columns spanning between the baseplate and the patch elements that position the patch elements at a vertical offset from a surface of the baseplate; and the support members comprising meandered features on surfaces abutting gaps between the support members housing orthogonal antenna feeds coupled to radio frequency links for the antenna structure.

2. The antenna structure of claim 1, wherein the meandered features comprise corrugations formed into bodies forming the surfaces of the support members such that an electrical length over a conductive path formed between the baseplate and the patch elements is larger than a phase delay corresponding to the vertical offset.

3. The antenna structure of claim 1, wherein the vertical offset comprises less than 0.25λ at a center frequency of the antenna structure.

4. The antenna structure of claim 1, wherein the vertical offset comprises approximately 0.12λ at a center frequency of the antenna structure.

5. The antenna structure of claim 1, wherein the meandered features comprise corrugations formed into the surfaces.

6. The antenna structure of claim 1, wherein the meandered features comprise helical corrugations formed about circumferences of the columns.

7. The antenna structure of claim 1, wherein the meandered features comprise circumferential corrugations formed into the columns.

8. The antenna structure of claim 1, wherein the meandered features comprise corrugations formed into corner portions of the columns facing the antenna feeds.

9. The antenna structure of claim 1, wherein the baseplate comprises a conductive patch mated to a longitudinal end of the support members opposite to that of the patch elements; and wherein the baseplate is configured to conductively mate the antenna structure into an array baseplate configured to hold a plurality of antenna structures.

10. The antenna structure of claim 9, wherein the array baseplate comprises a rectangular grid of receiving features configured to fit baseplates of the plurality of antenna structures.

11. The antenna structure of claim 9, wherein the array baseplate comprises a grid of receiving features configured to fit baseplates of the plurality of antenna structures.

12. The antenna structure of claim 1, comprising:
subassemblies each comprising a patch element and a corresponding support member, wherein a set of four subassemblies are mated to the baseplate and disposed about the antenna feeds to form the antenna structure.

13. The antenna structure of claim 1, wherein each antenna feed comprises a conductive strip having a feed section coupled to a corresponding radio frequency link through the baseplate, a transverse section generally parallel with the baseplate, and a terminal section directed back toward the baseplate.

14. An antenna array, comprising:
an array baseplate having apertures into which a plurality of antenna subassemblies are held;
each of the plurality of antenna subassemblies comprising:
a set of four patch elements conductively coupled to a subassembly baseplate by corresponding cylindrical column support members that position the patch elements at a vertical offset from the baseplate; and
the support members comprising meandered features on surfaces abutting gaps between the support members housing orthogonal antenna feeds coupled to radio frequency links for the antenna structure.

15. The antenna array of claim 14, wherein the meandered features of each of the plurality of antenna subassembly comprise corrugations formed into bodies of the support members such that an electrical length over a conductive path formed between the subassembly baseplate and the patch elements is larger than a phase delay corresponding to the vertical offset.

16. The antenna array of claim 14,
wherein the meandered features comprise at least one among corrugations formed into the surfaces, helical corrugations formed about circumferences of the support members, and circumferential corrugations formed into the support members.

17. The antenna array of claim 14,
wherein the meandered features comprise corrugations formed into portions of the support members facing the antenna feeds.

18. A method, comprising:
forming a modular antenna structure by at least:
positioning overlapping orthogonal antenna feeds in a central region of a baseplate of the modular antenna structure;
attaching radiator subassemblies to the baseplate disposed about the orthogonal antenna feeds;
wherein the radiator subassemblies comprise patch elements conductively coupled to the baseplate by cylindrical column support members that position the patch elements at a vertical offset from a surface of the baseplate; and
wherein the support members comprise meandered features on surfaces abutting the central region between the support members.

19. The method of claim 18, comprising:
forming an antenna array by at least mounting baseplates of a plurality of the modular antenna structures into mounting features in an array baseplate, wherein the array baseplate establishes a grid of the plurality of the modular antenna structures.

* * * * *